United States Patent [19]

Baker et al.

[11] Patent Number: 4,927,114
[45] Date of Patent: May 22, 1990

[54] TILT VALVE CARTRIDGE

[75] Inventors: David J. Baker, Waverly, N.Y.; Kenneth J. Dubuque, Sheshequin, Pa.; John M. Estep, Granville Summit, Pa.; Charles J. Hix, Jr., Ulster, Pa.

[73] Assignee: Ingersoll-Rand Company, Woodcliff Lake, N.J.

[21] Appl. No.: 324,902

[22] Filed: Mar. 17, 1989

[51] Int. Cl.$^5$ ............................................. F16K 51/00
[52] U.S. Cl. ................................. 251/240; 137/454.2; 222/508; 222/517; 251/229
[58] Field of Search ................ 137/454.2, 448; 251/339, 229, 240; 222/505, 508, 517, 402.21

[56] References Cited

U.S. PATENT DOCUMENTS

| | | | |
|---|---|---|---|
| 448,262 | 3/1891 | Runnels | 137/448 |
| 977,562 | 12/1910 | Sloan | 251/240 |
| 2,756,775 | 7/1956 | Hyde | 137/454.2 |
| 4,561,633 | 12/1985 | Haiges | 251/339 |

*Primary Examiner*—A. Michael Chambers
*Attorney, Agent, or Firm*—Robert F. Palermo; Arthur N. Trausch; Walter C. Vliet

[57] ABSTRACT

A tilt valve cartridge for a pneumatic mechanism has a cylindrical housing having two open ends, an annular valve seat secured in one open end, a valve member in tiltable contact with the annular seat and having a valve stem which extends through the valve seat and protrudes from the end of the cylinder, a spring to hold the valve member in a normally closed relationship with the valve seat, a sealing element secured to the cylindrical housing on its exterior surface so as to seal the interface between the cartridge and the mechanism, and retention feature to capture the valve member and valve biasing spring within the cylindrical cartridge. The modular cartridge feature simplifies installation and replacement of the valve in the inlet air passage of the pneumatic mechanism.

9 Claims, 2 Drawing Sheets

TILT VALVE CARTRIDGE

BACKGROUND OF THE INVENTION

The present invention relates to a tilt valve for a pneumatic mechanism and in particular to a tilt valve cartridge for a handheld pneumatic power tool.

Pneumatic mechanisms include an inlet throttle control valve to control the speed of the tool. The throttle can be trigger or lever operated. Various tilt valve constructions have been used as the inlet control valve. The component parts are typically assembled in the inlet connection of the mechanism.

Assembly, disassembly, and repair of the known tilt valves is difficult because the individual parts are typically assembled in place in the inlet chamber. The parts may include for example a valve seat, O-ring seal, spring, valve and stem, and snap ring. Also, the assembly is further made difficult by the need to operationally connect the tilt valve stem to the throttle plunger. Known plungers have a cross hole that holds the tilt valve stem through the entire angular throw of the valve. Known plungers are thus complex to manufacture and assemble.

SUMMARY OF THE INVENTION

It is therefore an object of the present invention to provide a tilt valve construction having a cartridge configuration.

It is another object of the present invention to provide a tilt valve cartridge having less parts than conventional tilt valve assemblies.

It is another object of the present invention to provide a tilt valve cartridge having easier assembly, disassembly, and modular repair.

It is another object of the present invention to provide a tilt valve cartridge and guide assembly providing simple and reliable operational contact between the valve stem and the throttle plunger through the entire angular movement of the tilt valve.

In one aspect of the present invention, the above objects are accomplished by providing a cylindrical housing having a central passageway connecting a first open end and a second open end. A valve seat is provided in the passageway at the first open end of the housing. A valve member is in tiltable contact with the valve seat and has a valve stem extending from the valve member so as to protrude from the first open end. A spring is provided in the housing to bias the valve member to a closed position. A sealing member is provided on the outside of the housing to seal the cartridge in the pneumatic mechanism.

The foregoing and other aspects of the present invention will become apparent from the following detailed description of the invention when considered in conjunction with the accompanying drawings. It is to be understood, however, that the figures are not intended as definitions of the invention but are only for the purposes of illustration.

DETAILED DESCRIPTION OF THE PREFERRED EMBODIMENT

Figure 1:
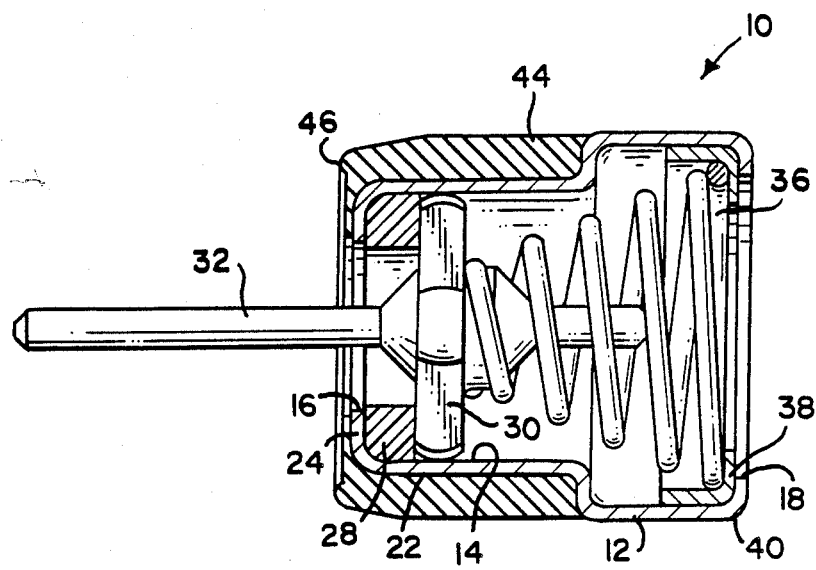
FIG. 1 is a cross sectional side view schematically illustrating a preferred embodiment of the tilt valve cartridge of the present invention.

Referring to FIG. 1, a tilt valve cartridge 10 includes a cylindrical housing 12 having a hollow central passageway 14 connecting a first open end 16 and a second open end 18. The housing is preferably constructed so as to have a reduced diameter portion 22 adjacent the first open end. Additionally, the opening at the first open end may be partially closed such as by a flange 24 which extends radially inward from the cylindrical housing. The central passageway still provides fluid communication between the partially closed first end and the open second end.

An annular valve seat 28 is provided in the passageway at the first open end of the housing. The valve seat is preferably of a hard composite material and abuts the first end flange 24.

A valve member 30 of suitable valve material is positioned in contact with the valve seat 28. A valve stem 32 extends axially from the valve member so that a portion protrudes from the first open end of the housing.

A coil spring 36 is provided in the housing to bias the valve member 30 into contact with the valve seat to close the passageway. The spring is retained in the housing by a retainer ring (not shown) or by a spring seat 38 retained by a flange 40 or by a flange 40 alone at the second open end of the cylindrical housing.

A seal member 44 is provided on the outer circumference of the housing at the reduced diameter portion. The seal member is constructed of an appropriate material such as rubber or a soft plastic. The sealing member 44 has an axially extending circumferential sealing surface 46 on the axial face. The sealing member 44 seals the cartridge in the inlet passage of a pneumatic device.

Figure 2:
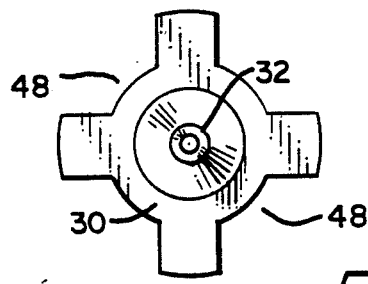
FIG. 2 is a front view of a valve member.

As best seen in FIG. 2, the valve member 30 is generally circular with a plurality of axial slots 48 in the perimeter. These slots allow fluid flow through the central passageway when the valve is tilted as will now be described.

Figure 3:
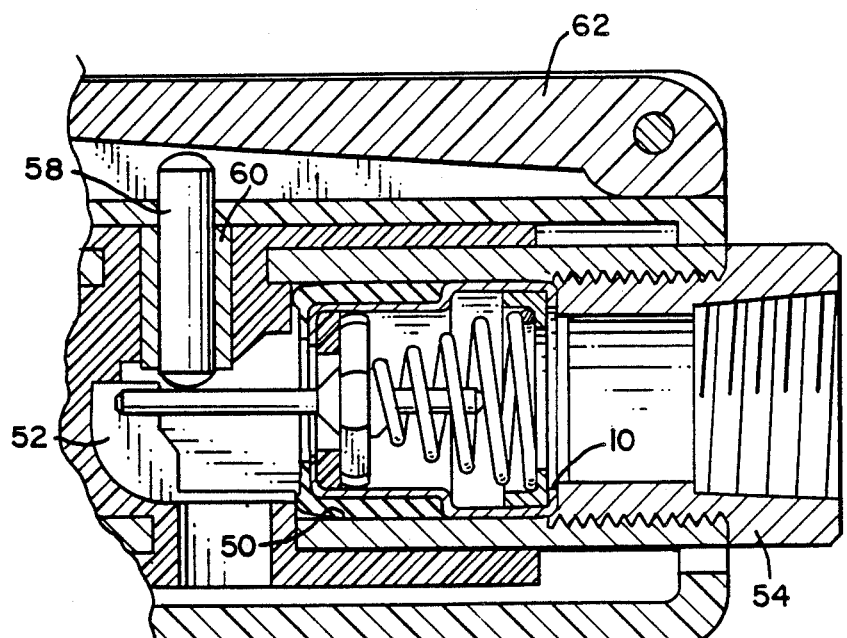
FIG. 3 is a cross sectional side view schematically illustrating a tilt valve cartridge and guide assembly in a pneumatic tool.

Referring to FIG. 3, the tilt valve cartridge 10 is shown schematically in a pneumatic power tool. The cartridge 10 is merely dropped into the air inlet opening 50 of a tool such that the protruding portion of the valve stem projects into an axial guide slot 52 in the tool. A retaining member 54 holds the cartridge in the tool. A throttle valve plunger 58 is inserted in a bushing in the tool housing to contact the valve stem 32. A throttle lever 62, or alternatively a trigger (not shown), can be positioned to operate the throttle plunger 58.

To turn the tool on, the throttle lever is depressed which moves the throttle plunger 58 radially inward. The projecting portion of the valve stem 32 is forced radially downward in the guide slots 52. A top portion of the valve member 30 pivots on the valve seat 24. The bottom perimeter of the valve member 30 moves away from the valve seat 24 which allows fluid to flow from the passageway through the axial slots 48 to operate the pneumatic device.

The present invention allows easier assembly of the tool in the factory and quick replacement of a tilt valve cartridge in the field. The tilt valve guide slots allow simplified assembly and accurate throttle performance. The tilt valve cartridge of the present invention can be installed in a variety of pneumatic tools.

While this invention has been illustrated and described in accordance with a preferred embodiment related to a handheld pneumatic power tool, it should be recognized that variations and changes may be made herewith without departing from the invention as set forth in the following claim.

We claim:

1. A tilt valve cartridge for a pneumatic mechanism comprising:
   a cylindrical housing having a central passageway connecting a first open end and a second open end, said first open end having a smaller diameter than that of said second open end, said first and second ends having means for retaining interior parts within said cartridge;
   valve seat in the passageway at the first open end of the housing;
   valve member in tiltable contact with the valve seat;
   valve stem extending from the valve member and protruding from the first open end;
   means for biasing the valve member to a closed position; and
   means for sealing said cartridge in said mechanism.

2. The valve cartridge of claim 1 wherein said means for sealing said cartridge in said mechanism housing has a reduced diameter portion at the first end and comprises an annular sealing member on the reduced diameter portion.

3. The valve cartridge of claim 2 wherein said sealing member has an axially extending sealing face.

4. The valve cartridge of claim 1 wherein said biasing means is a coil spring and wherein said means for retaining all interior parts within said cartridge comprises a rolled flange at each end which captures interior parts.

5. The valve cartridge of claim 4 wherein said means for retaining interior parts within said cartridge comprises a rolled flange at said first end and retainer ring at said second end.

6. The valve cartridge of claim 4 wherein said means for retaining interior parts within said cartridge comprises a rolled flange at said first end, and a spring seat retained by a rolled flange at said second end.

7. The valve cartridge of claim 1 wherein said valve seat is annular and said valve member has a perimeter having axial slots concentrically abutting the valve seat.

8. The valve cartridge of claim 7 wherein said valve member is moved to an open position by tilting the valve stem to pivot the valve member on the valve seat and open the axial slots.

9. A tilt valve cartridge and guide assembly for a pneumatic tool comprising:
   a cylindrical housing having a central passageway connecting a first reduced diameter open end and a second open end;
   an annular valve seat contained in the passageway at the reduced diameter end;
   a valve member in tiltable contact with the valve seat;
   a valve stem extending from the valve member and having a portion protruding from the first end of the housing;
   means for biasing the valve member to a closed position;
   an annular sealing member on the reduced diameter portion for sealing the cartridge in the tool; and
   guide means associated with said tool and positioned adjacent the protruding portion of the valve stem to guide the stem so as to tilt only in one direction.

* * * * *